US011522832B2

(12) United States Patent
McCarty et al.

(10) Patent No.: US 11,522,832 B2
(45) Date of Patent: Dec. 6, 2022

(54) SECURE INTERNET GATEWAY

(71) Applicant: Target Brands, Inc., Minneapolis, MN (US)

(72) Inventors: Gordon James McCarty, Nowthen, MN (US); Dmitri Aleksandrovich Zadvornov, Anoka, MN (US); DeYung Quoc Le, Brooklyn Park, MN (US)

(73) Assignee: Target Brands, Inc., Minneapolis, MN (US)

(*) Notice: Subject to any disclaimer, the term of this patent is extended or adjusted under 35 U.S.C. 154(b) by 244 days.

(21) Appl. No.: 16/204,638

(22) Filed: Nov. 29, 2018

(65) Prior Publication Data

US 2020/0177544 A1 Jun. 4, 2020

(51) Int. Cl.
*H04L 9/40* (2022.01)
*H04L 12/66* (2006.01)
*H04L 67/56* (2022.01)

(52) U.S. Cl.
CPC .......... *H04L 63/0209* (2013.01); *H04L 12/66* (2013.01); *H04L 63/0263* (2013.01); *H04L 63/0281* (2013.01); *H04L 63/1433* (2013.01); *H04L 67/56* (2022.05)

(58) Field of Classification Search
CPC .................................................. H04L 63/0209
See application file for complete search history.

(56) References Cited

U.S. PATENT DOCUMENTS

| 8,434,128 B2* | 4/2013 | Kennedy .............. H04L 63/105 |
| | | 709/224 |
| 8,438,240 B2 | 5/2013 | Prince et al. |
| 8,613,089 B1 | 12/2013 | Holloway et al. |
| 8,621,552 B1* | 12/2013 | Lotem ................ H04L 63/0263 |
| | | 713/193 |
| 9,270,719 B2 | 2/2016 | Chan |
| 9,438,565 B2 | 9/2016 | Cohen et al. |
| 9,553,845 B1* | 1/2017 | Talmor ............... H04L 63/0263 |
| 9,606,903 B2* | 3/2017 | Murugesan ......... G06F 11/3688 |
| 9,730,037 B2 | 8/2017 | Navda et al. |
| 9,807,079 B2 | 10/2017 | Doshi |
| 10,341,298 B1* | 7/2019 | Lichtenberg ........ H04L 63/0428 |
| 10,503,496 B2* | 12/2019 | Natari ....................... G06F 8/71 |
| 10,776,384 B1* | 9/2020 | Jackson ................ G06F 16/27 |
| 2005/0099959 A1* | 5/2005 | Standridge ........... H04L 41/145 |
| | | 370/252 |

(Continued)

FOREIGN PATENT DOCUMENTS

EP    3247082 A1    11/2017

OTHER PUBLICATIONS

Web page, Learn F5 Technologies, Get Answers & Share Community Solutions, https://devcentral.f5.com/, 7 pages, 2016.

(Continued)

*Primary Examiner* — Harris C Wang
(74) *Attorney, Agent, or Firm* — Theodore M. Magee; Westman, Champlin & Koehler, P.A.

(57) ABSTRACT

A system includes a plurality of secure gateways that each use a plurality of datasets to determine how to process messages between devices on a network and websites on the internet. A version control server in the system automatically sends a dataset to each secure gateway in the plurality of secure gateways.

13 Claims, 8 Drawing Sheets

(56) References Cited

U.S. PATENT DOCUMENTS

| | | | | |
|---|---|---|---|---|
| 2005/0262236 | A1* | 11/2005 | Schachtely | G05B 23/0227 709/224 |
| 2008/0172575 | A1* | 7/2008 | Dunagan | H04L 41/12 714/27 |
| 2009/0300748 | A1* | 12/2009 | Diehl | H04L 63/0263 726/11 |
| 2010/0037289 | A1* | 2/2010 | Roy | G06F 21/604 726/1 |
| 2010/0197296 | A1* | 8/2010 | Bovet | H04W 24/06 455/424 |
| 2010/0299741 | A1* | 11/2010 | Harrison | H04L 63/0263 726/12 |
| 2011/0072506 | A1* | 3/2011 | Law | H04L 63/1416 726/11 |
| 2015/0256545 | A1* | 9/2015 | Dotterer, III | H04L 63/20 726/1 |
| 2015/0356001 | A1* | 12/2015 | Murugesan | G06F 11/3688 717/124 |
| 2016/0182685 | A1 | 6/2016 | Moran et al. | |
| 2016/0205069 | A1* | 7/2016 | Blöcher | H04L 63/1441 726/12 |
| 2018/0060220 | A1* | 3/2018 | Yao | G06F 11/3684 |
| 2018/0084000 | A1* | 3/2018 | Baukes | H04L 63/1433 |
| 2018/0109498 | A1 | 4/2018 | Singh | |
| 2018/0167285 | A1* | 6/2018 | Constantinescu | H04L 43/50 |
| 2018/0262348 | A1* | 9/2018 | Golshan | H04L 9/0838 |
| 2018/0349134 | A1* | 12/2018 | Studer | G06F 11/368 |
| 2020/0004665 | A1* | 1/2020 | Shinge | G06F 11/2294 |
| 2020/0177544 | A1* | 6/2020 | McCarty | H04L 63/145 |

OTHER PUBLICATIONS

Web page, Force Point, Getting Started Guide, http://www.websense.com/content/support/library/web/hosted/getting_started/getting_started.pdf, 116 pages, 2017.

Web page, McAfee, Web Protection: Configuring Web Hybrid Policy Synchronization, https://community.mcafee.com/t5/Documents/Web-Protection-Configuring-Web-Hybrid-Policy-Synchronization/ta-p/553793, 12 pages, 2018.

* cited by examiner

SECURE INTERNET GATEWAY

BACKGROUND

Messages and requests sent through a network are referred to collectively as network traffic. Such messages and requests that are being sent to or from devices on the internet are referred to collectively as internet traffic.

Secure gateways are generally placed between networks of computing devices and the Internet to filter internet traffic so as to prevent computing devices on the network from accessing certain websites, to implement IP address translations and to prevent proprietary data from leaving the network over the Internet. Some secure gateways determine if an Internet message should be intercepted or rerouted by comparing parameters of the Internet message to parameters stored in one or more dataset files (referred to simply as datasets) and using one or more rules in a ruleset. For example, the URL of a website that is receiving the message can be compared to a list of URLs in a blocking dataset such that if the URL is found, the message is blocked by the secure gateway.

The discussion above is merely provided for general background information and is not intended to be used as an aid in determining the scope of the claimed subject matter. The claimed subject matter is not limited to implementations that solve any or all disadvantages noted in the background.

SUMMARY

A system includes a plurality of secure gateways that each use a plurality of datasets to determine how to process messages between devices on a network and websites on the internet. A version control server in the system automatically sends a dataset to each secure gateway in the plurality of secure gateways.

In a further embodiment, a method includes receiving an indication that a change to a dataset is acceptable to a designated owner of the dataset and in response to the received indication, automatically transmitting the dataset to a secure gateway for use by the secure gateway.

In a still further embodiment, a method includes receiving an indication that a change to a dataset has been accepted by an owner of the dataset and automatically loading the dataset to a testing secure gateway and performing at least one test on the testing secure gateway.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In a large enterprise, multiple secure gateways are used to connect the enterprise's networks to the internet. Each secure gateway requires the most-current datasets and rulesets in order to adequately protect the network. However, because datasets and rulesets change often, updating all of the multiple secure gateways becomes an error-prone operation in which it is common for one or more of the secure gateways to not receive one or more changed datasets or rulesets. This places the network at a substantial risk of acquiring a computer virus and can prevent network computers from accessing websites that require specialized handling of their network traffic.

In accordance with the various embodiments, a system is provided in which a version control system is used to make and accept changes to datasets and rulesets. When a change to a dataset or ruleset is accepted by a designated owner of the dataset/ruleset, the version control system automatically tests the dataset/ruleset and then automatically deploys the dataset/ruleset to each secure gateway in an enterprise's multiple networks.

In accordance with some embodiments, one or more of the secure gateways are configured to forward network traffic to a cloud-based proxy through the internet. In such embodiments, the version control system is further configured to forward some datasets/rulesets to one or more cloud-based proxies to define how certain traffic is to be handled by the cloud-based proxies.

Figure 1:
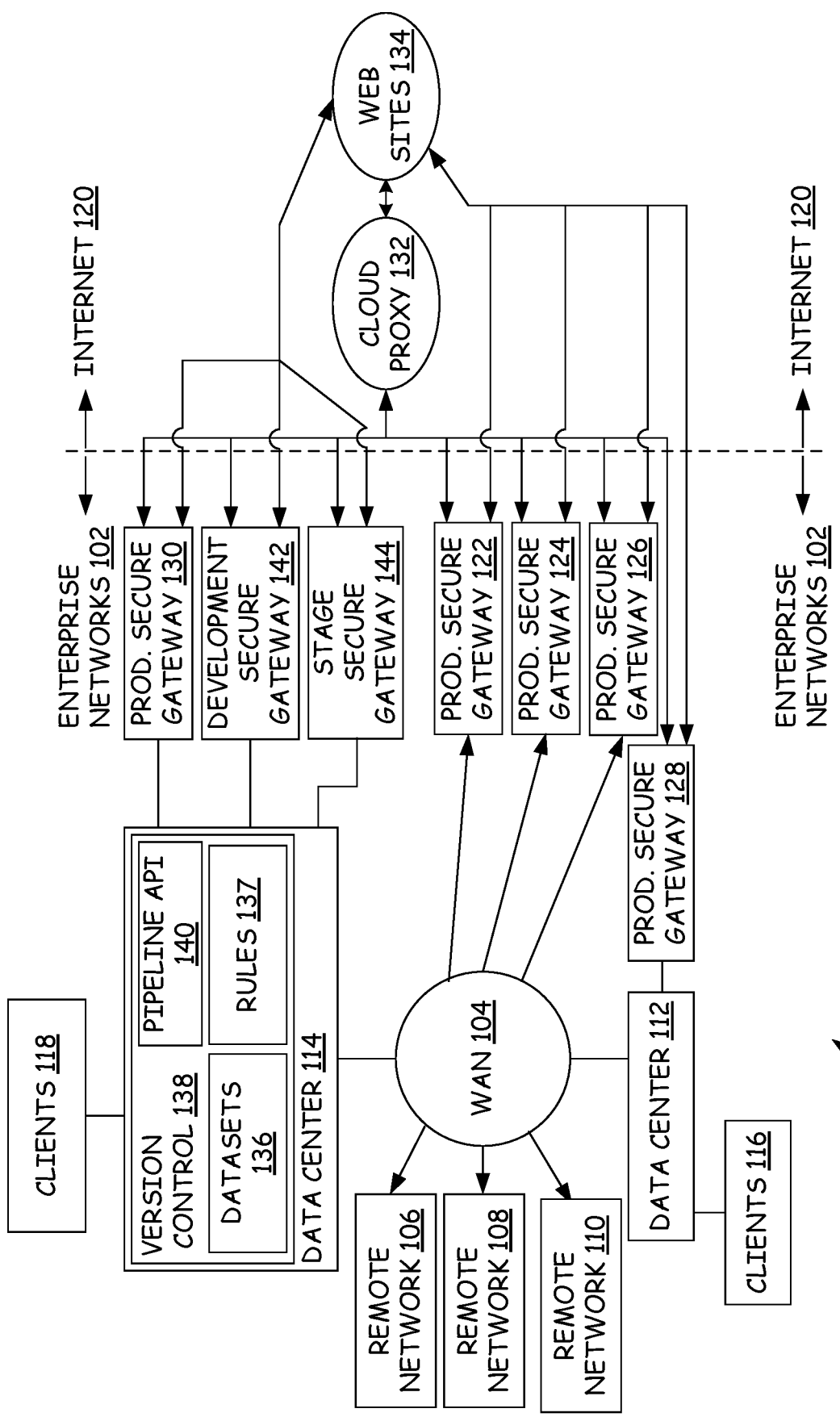
FIG. 1 is block diagram of a system in accordance with one embodiment.

FIG. 1 provides a block diagram of a system 100 in accordance with one embodiment for automatically testing and deploying datasets. System 100 includes enterprise networks 102 composed of a Wide Area Network 104, remote location networks 106, 108, and 110, datacenters 112 and 114 and client devices 116 and 118. WAN 104 provides connections between datacenter 112, datacenter 114 and devices connected to remote location networks 106, 108, and 110. In addition, WAN 104 provides connections between remote location networks 106, 108 and 110 and a collection of production secure gateways 122, 124 and 126. Production secure gateways 122, 124 and 126 provide secure access to websites 134 on Internet 120. Devices connected to WAN 104 can access production secure gateways 122, 124 and 126 through explicit port calls and through transparent rerouting of Internet traffic by WAN 104 to ports exposed by production secure gateways 122, 124 and 126.

Production secure gateway 130 provides secure access to websites 134 on internet 120 for devices connected to datacenter 114 and production secure gateway 128 provides secure access to websites 134 on internet 120 for devices connected to datacenter 112.

Each of production secure gateways 122, 124, 126, 128 and 130 determine how to handle particular internet traffic using a plurality of datasets and a plurality of rules. The datasets identify groups of internet traffic that should be handled in a similar manner. This traffic can be identified based on the IP address of the destination of the internet traffic, the IP address of the source of the internet traffic, the identity of the user sending the internet traffic, groups that the user belongs to, whether the device sending the traffic requires special handling of its internet traffic, and a portion or an entirety of a uniform resource located (URL) for the destination of the internet traffic, for example. The rules used by the production secure gateways define how internet traffic found in one or more datasets is to be handled including, for example:

whether the internet traffic is to pass through a proxy server on the internet, such as cloud proxy 132, before being sent to websites 134 or is to be sent to websites 134 directly by bypassing cloud proxy 132;

whether the internet traffic is to bypass the production secure gateway; and whether encrypted traffic, such as Secured Socket Layer/Transport Layer Security (SSL/ TLS) traffic, is to be decrypted at either or both of the production secure gateway or the cloud proxy 132.

Cloud proxy 132 also filters internet traffic to control which websites can be accessed by a device and to control what information is allowed to reach certain websites. In many cases, different datasets and rulesets are used by cloud proxy 132 than by the secured gateways. Because it is located on the internet, cloud proxy 132 can be reached by any device with an internet connection. This provides protection to devices that are outside of the network and thus cannot use a production secured gateway. In accordance with one embodiment, a two-tier system is utilized in which traffic first passes through a secured gateway for one level of processing and then is forwarded to a cloud proxy, such as cloud proxy 132 for a second level of processing. In such embodiments, some datasets identify traffic that will bypass the cloud proxy while other datasets identify traffic that will bypass the secured gateway and the cloud proxy.

In accordance with one embodiment, the datasets and rules used by the production secure gateways are created and modified using a version control system 138 on a version control server in datacenter 114. Version control system 138 provides a single production version of each dataset in datasets 136 and each ruleset in rules 137. In addition, version control system 138 can maintain multiple different development versions of each dataset and each ruleset where each development version contains proposed modifications to the respective datasets and rulesets. In accordance with some embodiments, one or more users of version control system 138 are designated as owners of the datasets/rulesets and have authority to determine when a development version of a dataset or ruleset is acceptable and can become the new production version that is then sent to and loaded on each production secure gateway as discussed further below. In some version control systems 138, a number of users are allowed to propose changes to the datasets 136 and rulesets 137.

Within version control system 138, a pipeline API 140 is responsible for monitoring version control system 138 to determine when an owner accepts changes to a dataset or ruleset, deploying such accepted datasets/rulesets to test environments, testing the datasets/rulesets in the test environment and finally deploying the datasets/rulesets that pass the tests to each of the production secure gateways so that the datasets and rulesets are loaded on to the production secure gateways thereby ensuring that all production secure gateways in enterprise networks 102 have the latest changes to the datasets and rulesets.

Figure 2:
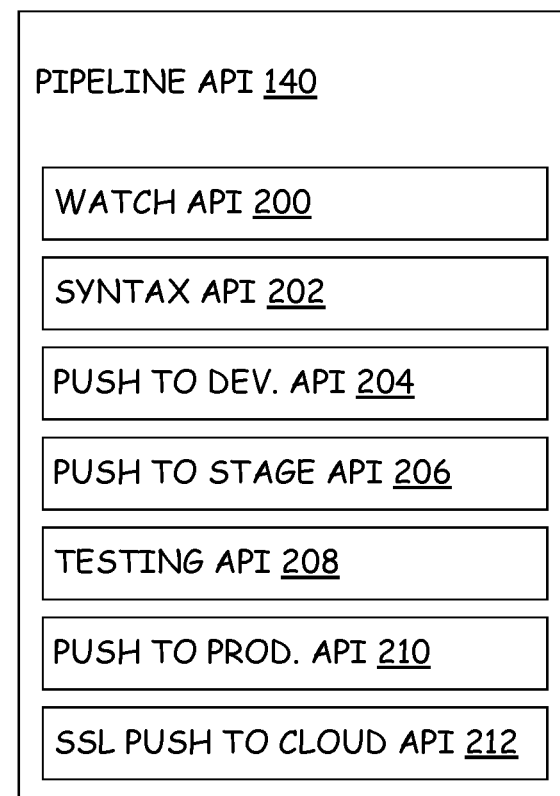
FIG. 2 is a block diagram of a pipeline API in accordance with one embodiment.
Figure 3:
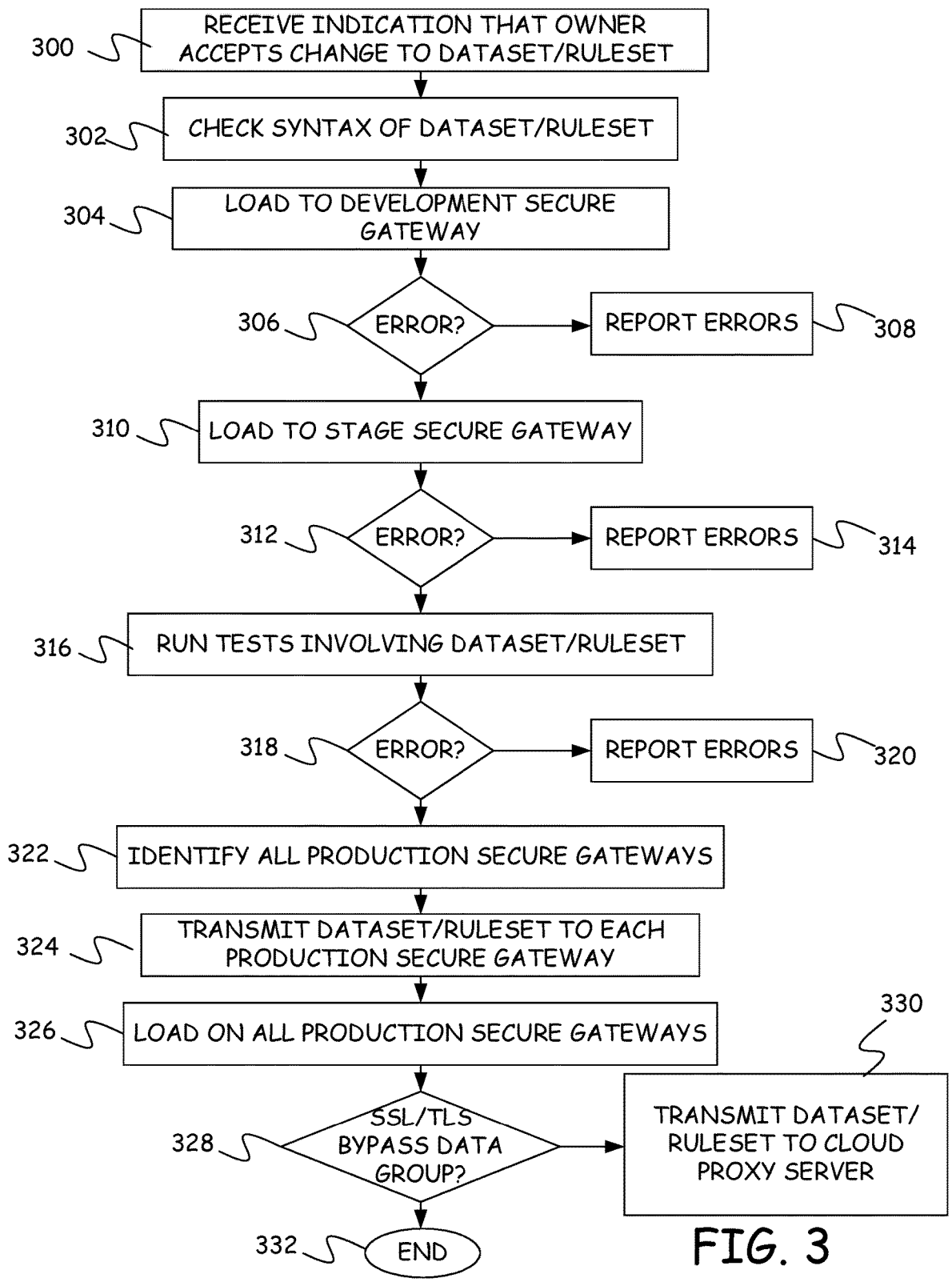
FIG. 3 is a flow diagram of a method of automatically testing and deploying datasets and rulesets for secure gateways.

FIG. 2 provides a block diagram of the individual modules that make up pipeline API 140 while FIG. 3 provides a flow diagram of the process implemented by pipeline API 140. In step 300 of FIG. 3, a watch API 200 of pipeline API 140 receives an indication that the owner of a dataset or ruleset has accepted a change to the dataset/ruleset. At step 302, a syntax API 202 checks the syntax of the dataset/ ruleset to ensure that the contents of the dataset/ruleset meet certain syntax requirements. At step 304, a push to development API 204 loads the dataset/ruleset to a development secure gateway 142 of FIG. 1 so that the dataset/ruleset is loaded on to the development secure gateway 142. At step 306, the push to development API 204 determines if there was a loading error when loading the dataset/ruleset to the development secure gateway. If there was an error during loading, the errors are reported to the dataset/ruleset owner through version control system 138 at step 308.

If there were no errors in loading the dataset/ruleset, a push to stage API 206 loads the dataset/ruleset to a stage secure gateway 144 of FIG. 1 at step 310. The stage secure gateway is designed to be configured in an identical manner to the production secure gateways so as to provide a robust testing environment that emulates the production environment. If there is an error in loading the dataset/ruleset at step 312, the error is reported to the owner at step 314. If there is no error in loading the dataset/ruleset to the stage secure gateway, a testing API 208 runs tests involving the dataset/ ruleset at step 316. In accordance with one embodiment, running such tests involves sending different types of internet traffic through stage secure gateway 144 from datacenter 114. In accordance with one embodiment, such testing utilizes each port exposed by stage secure gateway 144 for handling internet traffic. If testing API 208 determines that there was an error during testing at step 318, the error(s) are reported to the owner of the dataset/ruleset at step 320.

If no errors are detected at step 318, a push to production API 210 identifies all production secure gateways associated with enterprise network 102 at step 322. In accordance with one embodiment, version control system 138 includes a table designating all production secure gateways that are to receive each dataset and each ruleset. At step 324, push to production API 210 transmits the dataset/ruleset to each production secure gateway and causes the dataset/ruleset to be loaded on each production secure gateway at step 326. For example, each dataset 136/ruleset 137 produced by version control 138 is loaded on to each of the production secure gateways 122, 124, 126, 128 and 130 of FIG. 1.

In accordance with some embodiments, by default, encrypted internet traffic such as Secured Socket Layer/ Transport Layer Security (SSL/TLS) internet traffic is decrypted at the production secure gateways and at cloud proxy 132. After being decrypted, the decrypted information is examined to determine if it contains proprietary information and/or harmful code. In some embodiments, the decrypted data is then re-encrypted using a different certificate and is forwarded on to website 134. Some websites do not permit such decryption and re-encryption using a different certificate. As a result, in order to allow access to such websites, encrypted traffic to such websites must bypass the SSL decryption at both the production secure gateways and the cloud proxy. Websites that are to bypass the production secure gateway are listed in an SSL intercept bypass dataset that is uploaded to each production secure gateway using the techniques described above. To ensure that the SSL traffic also bypasses SSL decryption at cloud proxy 132, at step 328, an SSL push to cloud API 212 determines if the dataset that was uploaded to the production secure gateway is an SSL intercept bypass dataset and if it is, transmits the dataset to the server hosting cloud proxy 132 at step 330. Thus, through steps 328 and 330, the embodiments ensure that encrypted internet traffic that cannot withstand decryption before reaching the destination website is not decrypted at either the production secure gateway or the cloud proxy.

Figure 4:
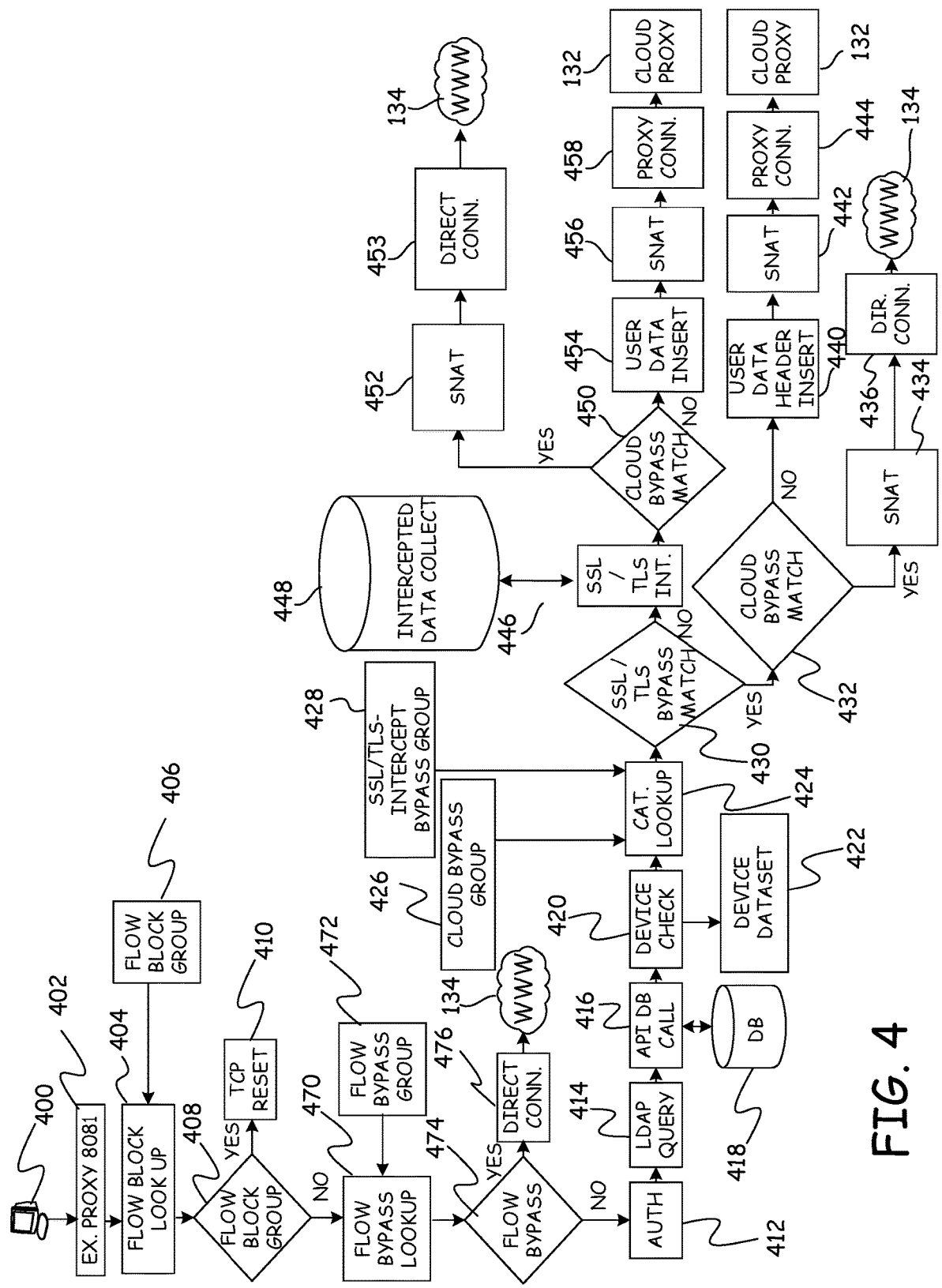
FIG. 4 is a combination flow and block diagram showing execution of a secure gateway in accordance with one embodiment.

FIG. 4 provides a combination block diagram and flow diagram showing the operation of a production secure gateway for explicit 8081 proxy traffic, thereby providing support for authenticated explicit connections. At step 402 of FIG. 4, a device 400 makes an explicit call to port 8081 of the production secure gateway. At step 404, the production secure gateway performs a flow block lookup using the flow block dataset 406, which provides a black list of IP addresses that internet traffic is barred from being sent to. At step 408, the production secure gateway determines if the internet traffic was being sent to an IP address in flow block dataset 406 and if it was, the connection is ended at step 410 using a Transmission Control Protocol (TCP) Reset command. If the traffic is not being sent to an IP address in flow block dataset 406, the destination IP address is compared to IP addresses in flow bypass dataset 472 at step 470. If the destination IP address is in flow bypass dataset 472 at step 474, the message is sent through a direct connection 476 to website 134 without further processing at the production secure gateway. Thus, the message bypasses much of the processing in the secure gateway.

If the destination IP address is not in flow bypass dataset 472, an authentication session is started at step 412 to authenticate the user if the user has not previously been authenticated by the production secure gateway. After identifying the user through authentication step 412, a lightweight directory access protocol (LDAP) query is performed on an enterprise directory at step 414 to identify various groups that the user is associated with. In addition to the user groups in the enterprise directory, further information about the user is retrieved using an API database call 416, which accesses a database 418 containing additional data about users and devices that can be inserted into the header of the internet message as discussed further below. At step 420, the IP address and host name of the device sending the message is compared to device dataset 422 to determine if the device sending the traffic is a device that requires specialized handling of its internet traffic. Traffic from such devices is handled separately and additional information is placed in the header of the message for proper processing by the cloud proxy and the destination website as discussed further below.

At step 424, a data lookup is performed to determine if the destination URL of the traffic matches a URL listed in cloud bypass dataset 426 or SSL-intercept bypass dataset 428. If the destination URL is in SSL-intercept bypass dataset 428 at step 430 and is in the cloud bypass dataset 426 at step 432, a Source Network Address Translation (SNAT) is performed to assign a new external IP address as the source address at step 434. The message is then sent through a direct connection 436 to website 134, where direct connection 436 simply means that the message does not pass through any other proxies or secure gateways before reaching website 134. The message may pass through a number of routers or other devices before reaching website 134 even though it is sent through direct connection 436.

If the destination URL matches a URL in SSL-intercept bypass dataset 428 at step 430 but does not match the cloud proxy bypass dataset 426 at step 432, user data is inserted into the header of the message at step 440 including, for example, the identity of the user, group(s) the user belongs to as identified in step 414, additional information identified for the user at step 416, and whether the device sending the message is a device requiring specialized handling as determined at step 420. At step 442, Source Network Address Translation is performed to set a new external IP address as the source IP address of the message and the message is sent to cloud proxy 132 through a connection 444.

If the destination URL does not match any of the URLs in SSL-intercept bypass dataset 428 at step 430, the SSL message is decrypted by an SSL intercept at step 446 and the decrypted data is stored as intercepted data 448 for later processing. The decrypted data is then re-encrypted. If the URL destination matches a URL in cloud bypass dataset 426 at step 450, the re-encrypted data is assigned a new external address at step 452 and is sent directly to website 134 through direct connection 453. Direct connection 453 simply means that the message does not pass through any other proxies or secure gateways before reaching website 134. The message may pass through a number of routers or other devices before reaching website 134 even though it is sent through direct connection 453.

If the URL destination does not match a URL in cloud bypass dataset 426 at step 450, user data is inserted into the header at step 454 including for example the user's identity, user groups that the user belongs to, additional information determined at step 416, and whether the user's device is a device requiring specialized handling as determined at step 420. At step 456, an external IP address is assigned to the message and the re-encrypted message is sent to cloud proxy 132 through a connection 458.

Figure 5:
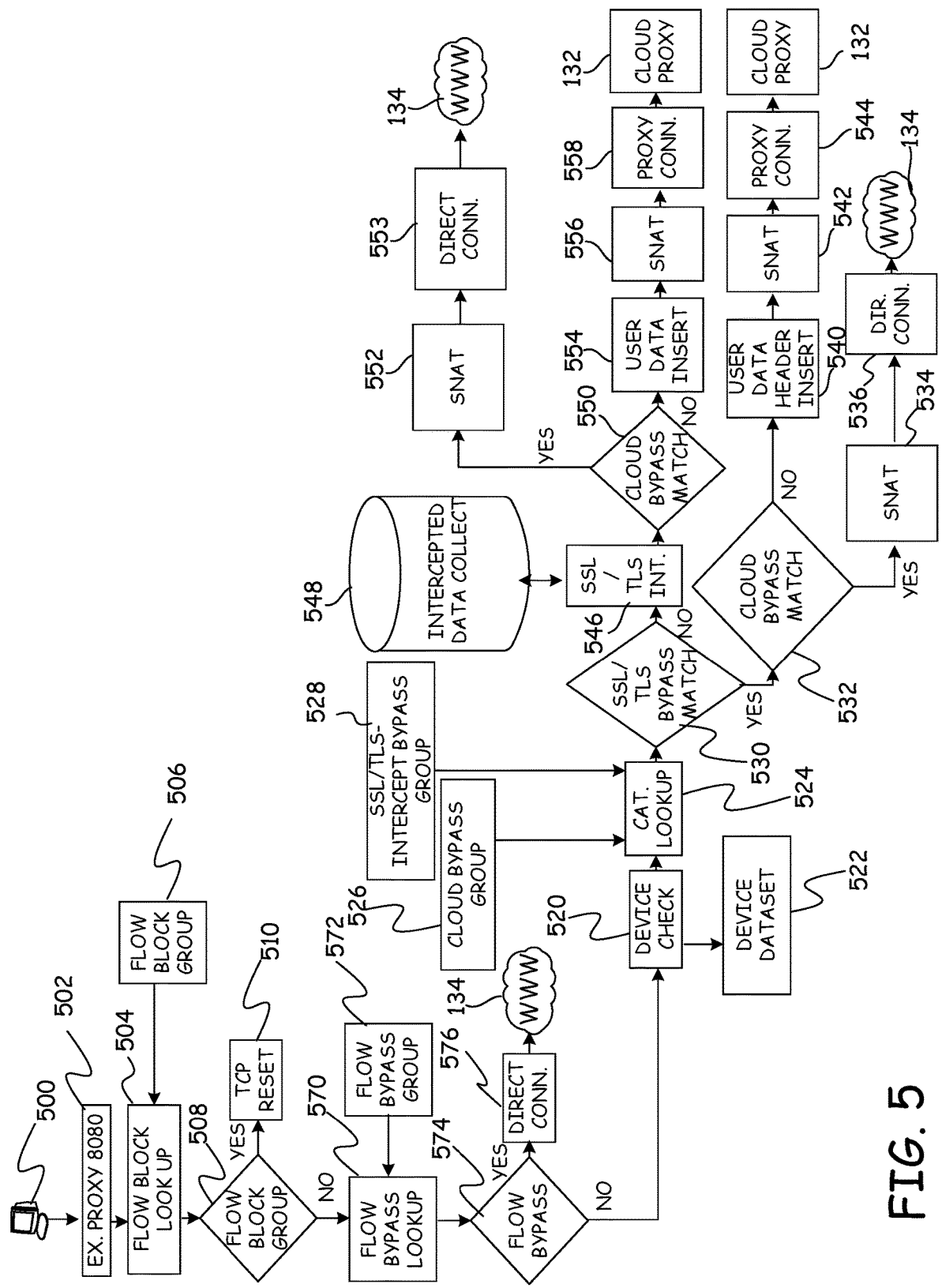
FIG. 5 is a combination flow and block diagram showing execution of a secure gateway in accordance with a second embodiment.

FIG. 5 provides a combination block diagram and flow diagram showing the operation of a production secure gateway for explicit 8080 proxy traffic, thereby providing support for unauthenticated explicit connections. At step 502 of FIG. 5, a device 500 makes an explicit call to port 8080 of the production secure gateway. At step 504, the production secure gateway performs a flow block lookup using the flow block dataset 506, which provides a black list of IP addresses that internet traffic is barred from being sent to. At step 508, the production secure gateway determines if the internet traffic was being sent to an IP address in flow block dataset 506 and if it was, the connection is ended at step 510 using a Transmission Control Protocol (TCP) Reset command. If the traffic is not being sent to an IP address in flow block dataset 506, the destination IP address is compared to IP addresses in flow bypass dataset 572 at step 570. If the destination IP address is in flow bypass dataset 572 at step 574, the message is sent through a direct connection 576 to website 134 without further processing at the production secure gateway. Thus, the message bypasses much of the processing in the secure gateway.

If the destination IP address is not in flow bypass dataset 572, the IP address and host name of the device sending the message is compared to a device dataset 522 to determine if the device sending the traffic requires specialized handling of its internet traffic. Traffic from such devices is handled separately and additional information is placed in the header of the message for proper processing by the cloud proxy and the destination website as discussed further below.

At step 524, a data lookup is performed to determine if the destination URL of the traffic matches a URL listed in cloud bypass dataset 526 or SSL-intercept bypass dataset 528. If the destination URL is in SSL/TLS-intercept bypass dataset 528 at step 530 and is in the cloud bypass dataset 526 at step 532, a Source Network Address Translation (SNAT) is performed to assign a new external IP address as the source address at step 534. The message is then sent through a direct connection 536 to website 134, where direct connection 536 simply means that the message does not pass through any other proxies or secure gateways before reaching website 134. The message may pass through a number of routers or other devices before reaching website 134 even though it is sent through direct connection 536.

If the destination URL matches a URL in SSL/TLS-intercept bypass dataset 528 at step 530 but does not match the cloud proxy bypass dataset 526 at step 532, user data is inserted into the header of the message at step 540 including, for example, the identity of the user, group(s) the user belongs to as identified in step 514, additional information identified for the user at step 516, and whether the device sending the message is a device requiring specialized handling as determined at step 520. At step 542, Source Network Address Translation is performed to set a new external IP address as the source IP address of the message and the message is sent to cloud proxy 132 through a connection 544.

If the destination URL does not match any of the URLs in SSL/TLS-intercept bypass dataset 528 at step 530, the SSL/TLS message is decrypted by an SSL/TLS intercept at step 546 and the decrypted data is stored as intercepted data 548 for later processing. The decrypted data is then re-encrypted. If the URL destination matches a URL in cloud bypass dataset 526 at step 550, the re-encrypted data is assigned a new external address at step 552 and is sent directly to website 134 through direct connection 553. Direct connection 553 simply means that the message does not pass through any other proxies or secure gateways before reaching website 134. The message may pass through a number of routers or other devices before reaching website 134 even though it is sent through direct connection 553.

If the URL destination does not match a URL in cloud bypass dataset 526 at step 550, user data is inserted into the header at step 554 including for example the user's identity, user groups that the user belongs to, additional information determined at step 516, and whether the user's device is a device requiring specialized handling as determined at step 520. At step 556, an external IP address is assigned to the message and the re-encrypted message is sent to cloud proxy 132 through a connection 558.

Figure 6:
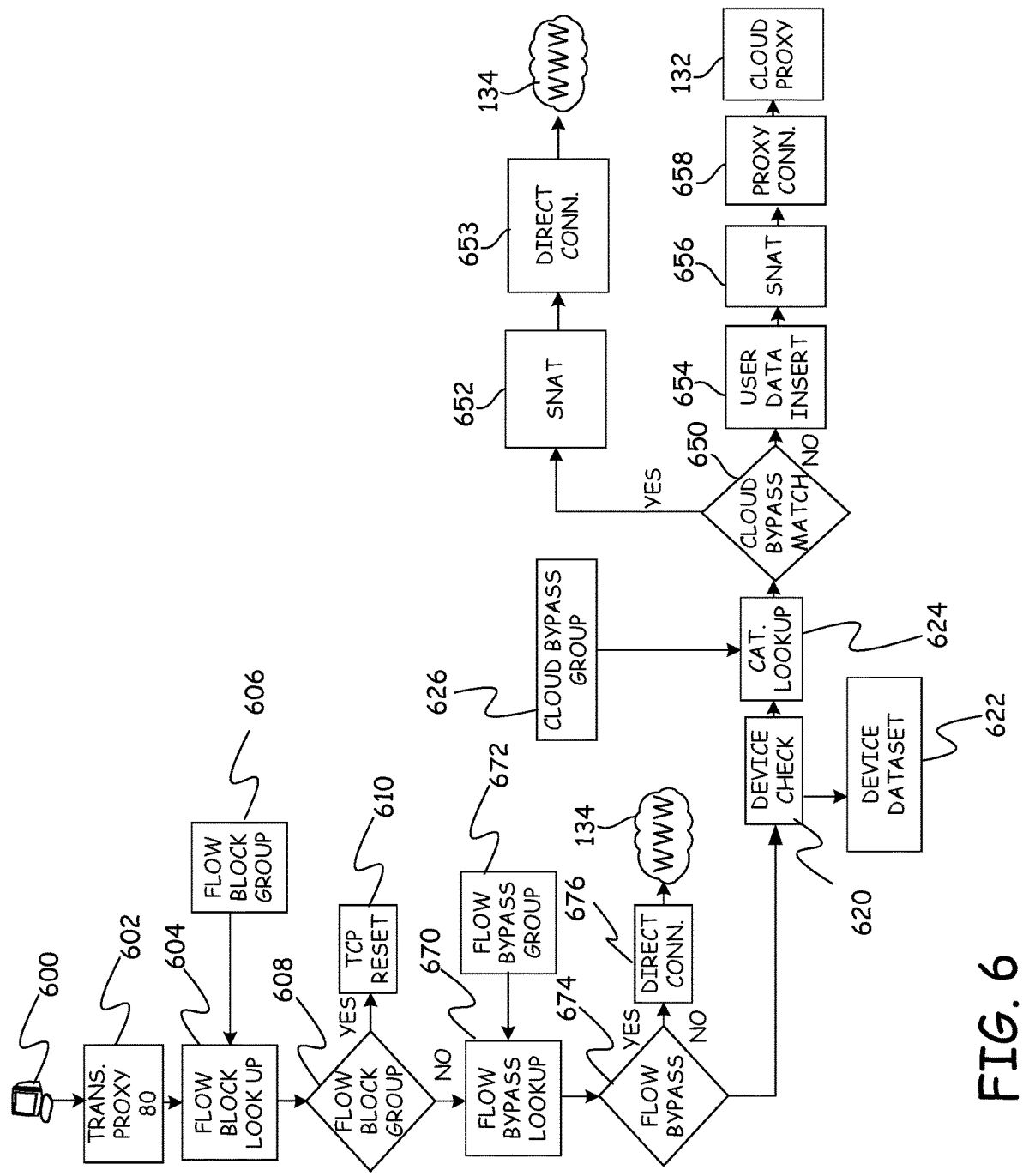
FIG. 6 is a combination flow and block diagram showing execution of a secure gateway in accordance with a third embodiment.

FIG. 6 provides a combination block diagram and flow diagram showing the operation of a production secure gateway for transparent port 80 proxy traffic, thereby providing support for transparent HTTP connections. At step 602 of FIG. 6, a device 600 attempts to send a message to website 134 and the message is automatically rerouted to port 80 of one of the production secure gateways. At step 604, the production secure gateway performs a flow block lookup using the flow block dataset 606, which provides a black list of IP addresses that internet traffic is barred from being sent to. At step 608, the production secure gateway determines if the internet traffic was being sent to an IP address in flow block dataset 606 and if it was, the connection is ended at step 610 using a Transmission Control Protocol (TCP) Reset command. If the traffic is not being sent to an IP address in flow block dataset 606, the destination IP address is compared to IP addresses in flow bypass dataset 672 at step 670. If the destination IP address is in flow bypass dataset 672 at step 674, the message is sent through a direct connection 676 to website 134 without further processing at the production secure gateway. Thus, the message bypasses much of the processing in the secure gateway.

At step 620, the IP address and host name of the device sending the message is compared to a device dataset 622 to determine if the device sending the traffic requires specialized handling of its internet traffic. Traffic from such devices is handled separately and additional information is placed in the header of the message for proper processing by the cloud proxy and the destination website as discussed further below.

At step 624, a data lookup is performed to determine if the destination URL of the traffic matches a URL listed in cloud bypass dataset 626. If the URL destination matches a URL in cloud bypass dataset 626 at step 650, message is assigned a new external address at step 652 and is sent directly to website 134 through direct connection 653. Direct connection 653 simply means that the message does not pass through any other proxies or secure gateways before reaching website 134. The message may pass through a number of routers or other devices before reaching website 134 even though it is sent through direct connection 653.

If the URL destination does not match a URL in cloud bypass dataset 626 at step 650, user data is inserted into the header at step 654 including whether the user's device is a device requiring specialized handling as determined at step 620. At step 656, an external IP address is assigned to the message and the message is sent to cloud proxy 132 through a connection 658.

Figure 7:
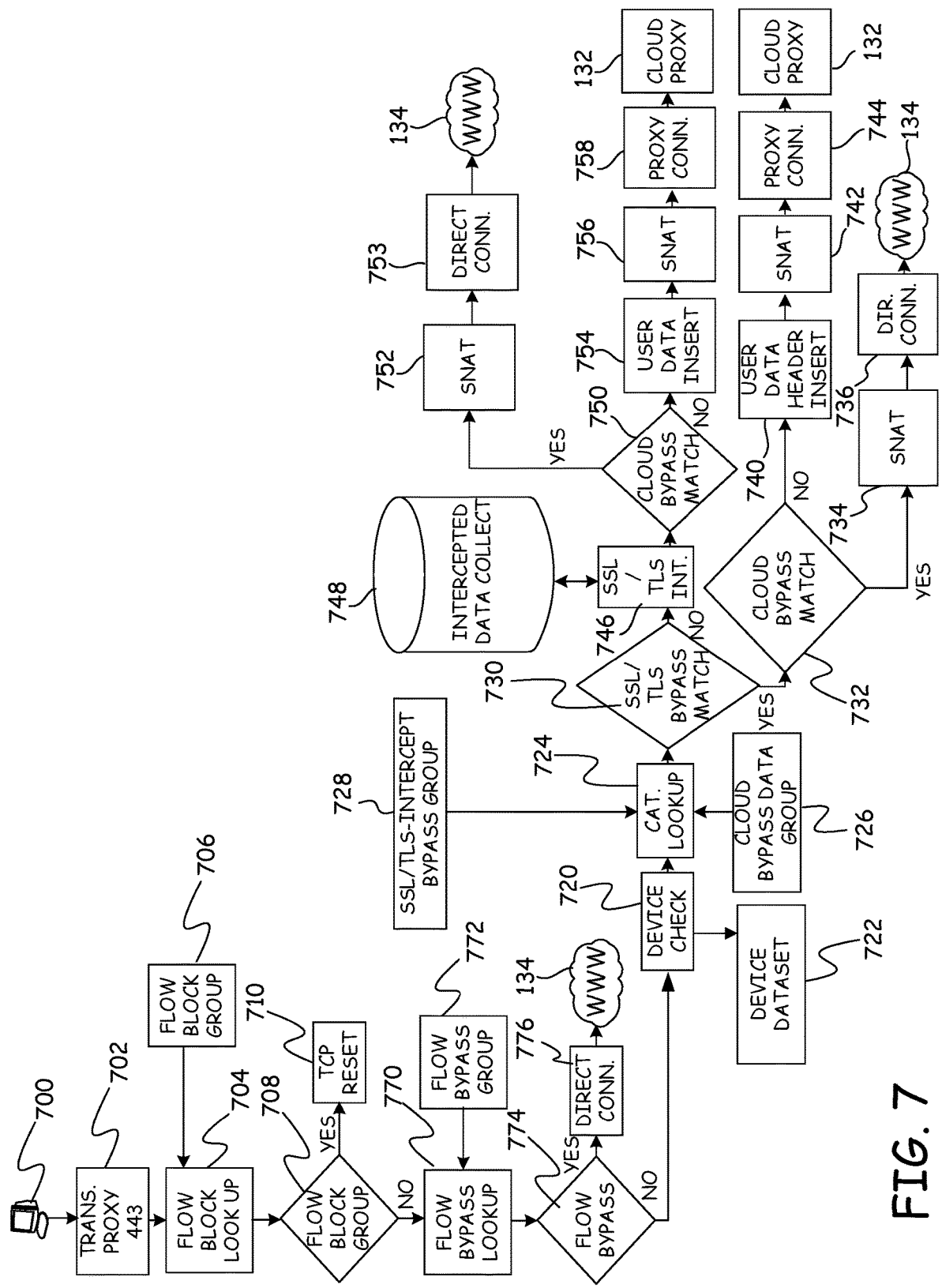
FIG. 7 is a combination flow and block diagram showing execution of a secure gateway in accordance with a fourth embodiment.

FIG. 7 provides a combination block diagram and flow diagram showing the operation of a production secure gateway for transparent port 443 traffic, thereby providing support for transparent HTTPS connections. At step 702 of FIG. 7, a device 700 makes a direct call to the internet server and is redirected to the production secure gateway. At step 704, the production secure gateway performs a flow block lookup using the flow block dataset 706, which provides a black list of IP addresses that internet traffic is barred from being sent to. At step 708, the production secure gateway determines if the internet traffic was being sent to an IP address in flow block dataset 706 and if it was, the connection is ended at step 710 using a Transmission Control Protocol (TCP) Reset command. If the traffic is not being sent to an IP address in flow block dataset 706, the destination IP address is compared to IP addresses in flow bypass dataset 772 at step 770. If the destination IP address is in flow bypass dataset 772 at step 774, the message is sent through a direct connection 776 to website 134 without further processing at the production secure gateway. Thus, the message bypasses much of the processing in the secure gateway.

At step 720, the IP address and host name of the device sending the message is compared to a device dataset 722 to determine if the device sending the traffic requires specialized handling of its internet traffic. Traffic from such devices is handled separately and additional information is placed in the header of the message for proper processing by the cloud proxy and the destination website as discussed further below.

At step 724, a data lookup is performed to determine if the destination URL of the traffic matches a URL listed in cloud bypass dataset 726 or SSL/TLS-intercept bypass dataset 728. If the destination URL is in SSL/TLS-intercept bypass dataset 728 at step 730 and is in the cloud bypass dataset 726 at step 732, a Source Network Address Translation (SNAT) is performed to assign a new external IP address as the source address at step 734. The message is then sent through a direct connection 736 to website 134, where direct connection 736 simply means that the message does not pass through any other proxies or secure gateways before reaching website 134. The message may pass through a number of routers or other devices before reaching website 134 even though it is sent through direct connection 736.

If the destination URL matches a URL in SSL/TLS-intercept bypass dataset 728 at step 730 but does not match the cloud proxy bypass dataset 726 at step 732, user data is inserted into the header of the message at step 740 including, for example, the identity of the user, group(s) the user belongs to as identified in step 714, additional information identified for the user at step 716, and whether the device sending the message is a device requiring specialized handling of its internet traffic as determined at step 720. At step 742, Source Network Address Translation is performed to set a new external IP address as the source IP address of the message and the message is sent to cloud proxy 132 through a connection 744.

If the destination URL does not match any of the URLs in SSL/TLS-intercept bypass dataset 728 at step 730, the SSL/TLS message is decrypted by an SSL/TLS intercept at step 746 and the decrypted data is stored as intercepted data 748 for later processing. The decrypted data is then re-encrypted using a new certificate. If the URL destination matches a URL in cloud bypass dataset 726 at step 750, the re-encrypted data is assigned a new external address at step 752 and is sent directly to website 134 through direct connection 753. Direct connection 753 simply means that the message does not pass through any other proxies or secure gateways before reaching website 134. The message may pass through a number of routers or other devices before reaching website 134 even though it is sent through direct connection 753.

If the URL destination does not match a URL in cloud bypass dataset 726 at step 750, user data is inserted into the header at step 754 including for example the user's identity, user groups that the user belongs to, additional information determined at step 716, and whether the user's device is a device requiring specialized handling as determined at step 720. At step 756, an external IP address is assigned to the message and the re-encrypted message is sent to cloud proxy 132 through a connection 758.

Figure 8:
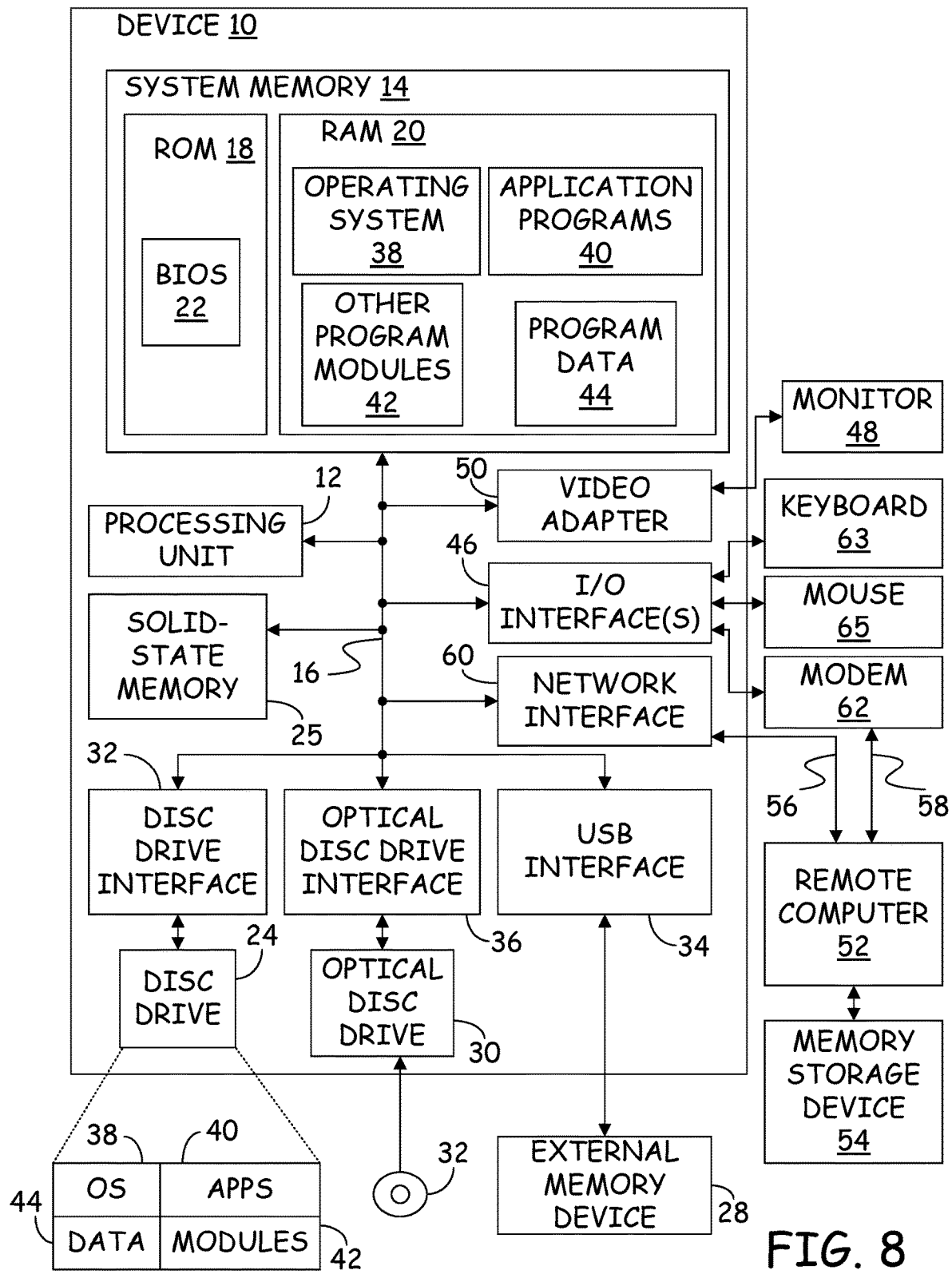
FIG. 8 is a block diagram of a computing environment used in accordance with the various embodiments.

FIG. 8 provides an example of a computing device 10 that can be used as a server or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The network connections depicted in FIG. 8 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 8 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A system comprising:
a plurality of production secure gateways that each use a plurality of datasets to determine how to process messages between devices on a network and websites on the internet; and
a version control server automatically sending a dataset to each production secure gateway in the plurality of production secure gateways
wherein before automatically sending the dataset to each production secure gateway, the version control server automatically loads the dataset on a test secure gateway, wherein the test secure gateway is configured in an identical manner to each production secure gateway of the plurality of production secure gateways and the test secure gateway communicates with internet websites that each production secure gateway communicates with, and the version control server automatically institutes testing on the test secure gateway that sends internet traffic to the test secure gateway and utilizes each port exposed by the test secure gateway for handling internet traffic.

2. The system of claim 1 wherein before automatically loading the dataset on the test secure gateway, the version control server receives an indication that a change to the dataset is acceptable to an owner of the dataset.

3. The system of claim 1 wherein the test secure gateway is a stage secure gateway.

4. The system of claim 1 wherein before automatically loading the dataset on the test secure gateway, automatically loading the dataset on a development secure gateway.

5. The system of claim 1 wherein each of the plurality of production secure gateways is configured to forward internet traffic through the internet to a proxy server.

6. The system of claim 5 wherein the dataset identifies network traffic that is to bypass the proxy server.

7. The system of claim 5 wherein each production secure gateway is configured to perform SSL/TLS intercept and a dataset identifies network traffic that is to bypass SSL/TLS intercept and wherein the version control server further automatically sends the dataset to the proxy server.

8. A method comprising:
a version control server automatically sending a dataset to each production secure gateway in a plurality of production secure gateways that each use a plurality of datasets to determine how to process messages between devices on a network and websites on the internet;
wherein before automatically sending the dataset to each production secure gateway, the version control server automatically loads the dataset on a test secure gateway, wherein the test secure gateway is configured in an identical manner to each production secure gateway of the plurality of production secure gateways and the test secure gateway communicates with internet websites that each production secure gateway communicates with, and the version control server automatically institutes testing on the test secure gateway that sends internet traffic to the test secure gateway and utilizes each port exposed by the test secure gateway for handling internet traffic.

9. The method of claim 8 wherein before automatically loading the dataset on the test secure gateway, the version control server receives an indication that a change to the dataset is acceptable to an owner of the dataset.

10. The method of claim 8 wherein before automatically loading the dataset on the test secure gateway, automatically loading the dataset on a development secure gateway.

11. The method of claim 8 wherein each of the plurality of production secure gateways is configured to forward internet traffic through the internet to a proxy server.

12. The method of claim 11 wherein the dataset identifies network traffic that is to bypass the proxy server.

13. The method of claim 12 wherein each production secure gateway is configured to perform SSL/TLS intercept and a dataset identifies network traffic that is to bypass SSL/TLS intercept and wherein the version control server further automatically sends the dataset to the proxy server.

* * * * *